United States Patent [19]
Ichiyama

[11] Patent Number: 6,126,320
[45] Date of Patent: *Oct. 3, 2000

[54] HYDRODYNAMIC PRESSURE BEARING

[75] Inventor: Yoshikazu Ichiyama, Kyoto, Japan

[73] Assignee: Nidec Corporation, Kyoto, Japan

[*] Notice: This patent is subject to a terminal disclaimer.

[21] Appl. No.: 09/432,017

[22] Filed: Nov. 2, 1999

Related U.S. Application Data

[62] Division of application No. 09/081,222, May 19, 1998, Pat. No. 6,059,459.

[30] Foreign Application Priority Data

May 19, 1997 [JP] Japan ................................. 9-128976

[51] Int. Cl.$^7$ ................................................ F16C 17/10
[52] U.S. Cl. ................................. 384/112; 384/107
[58] Field of Search .................................... 384/107, 111, 384/112, 113, 119

[56] References Cited

U.S. PATENT DOCUMENTS

| | | |
|---|---|---|
| 5,141,338 | 8/1992 | Asada et al. . |
| 5,407,281 | 4/1995 | Chen . |
| 5,423,612 | 6/1995 | Zang et al. . |
| 5,433,529 | 7/1995 | Hensel .................... 384/112 |
| 5,487,608 | 1/1996 | Leuthold et al. . |
| 5,524,986 | 6/1996 | Leuthold et al. . |
| 5,536,088 | 7/1996 | Cheever et al. . |
| 5,558,445 | 9/1996 | Chen et al. . |
| 5,658,080 | 8/1997 | Ichiyama . |
| 5,667,309 | 9/1997 | Nose . |
| 5,685,647 | 11/1997 | Leuthold et al. . |
| 5,718,516 | 2/1998 | Cheever et al. . |

FOREIGN PATENT DOCUMENTS 8-04777  1/1996  Japan .

*Primary Examiner*—Lenard A. Footland
*Attorney, Agent, or Firm*—McCormick, Paulding & Huber LLP

[57] ABSTRACT

In a hydrodynamic pressure bearing according to the present invention, the lubricating fluid held in the radial bearing portion is pumped toward the thrust bearing portion by grooves formed in the radial bearing portion. And the hydrodynamic pressure bearing is provided with a circumferential groove formed in the vicinity of the boundary region between the radial and thrust bearing portions so as to control the flow of lubricating fluid between the bearing portions depending on the amount of lubricating fluid held therein. The circumferential groove is formed on the sleeve member near the inner opening of a communicating hole which in turn axially passes through the thrust plate and communicates the gap defined by the shaft and the sleeve member therebetween with the external atmosphere. While a predetermined amount of lubricating fluid is retained in the gap, some extra lubricating fluid is also retained in the vicinity of the inner opening of the communicating hole. As the lubricating fluid is reduced by evaporation or other factors, air enters the gap through the communicating hole by the effect of atmospheric pressure. The air is retained near the circumferential groove and separates the lubricating fluid into the radial bearing portion and the thrust bearing portion. As a result, the flow of the lubricating fluid is interrupted.

4 Claims, 8 Drawing Sheets

HYDRODYNAMIC PRESSURE BEARING

CROSS REFERENCE TO RELATED APPLICATION

This application is a divisional of the U.S. patent application Ser. No. 09/081,222 entitled HYDRODYNAMIC PRESSURE BEARING, filed on May 19, 1998 now U.S. Pat. No. 6,059,459.

BACKGROUND OF THE INVENTION

The present invention relates to a hydrodynamic pressure bearing for supporting a rotating member by hydrodynamic pressure which is generated in lubricating fluid filled in a gap defined between the shaft and the sleeve member, and more to a hydrodynamic pressure bearing for use in a motor, including but not limited to, a spindle motor for driving at least one hard disk and more specifically, a DC motor for driving a CD-ROM.

In general, a hydrodynamic fluid pressure bearing includes a shaft, a disk-shaped thrust plate which extends radially outwardly extending from the shaft, a sleeve member which surrounds the shaft and the thrust plate with a gap to rotate relative to the shaft, and lubricating fluid filled in the gap defined by the shaft and the sleeve member therebetween. A radial bearing portion has a plurality of grooves for generating hydrodynamic pressure in the lubricating fluid. The grooves are formed on an outer surface of the shaft and/or the inner surface of the sleeve member at a portion radially opposing the outer surface of the shaft. A thrust bearing portion has a plurality of grooves for generating hydrodynamic pressure in the lubricating fluid. The thrust bearing grooves are formed on the upper and lower surfaces of the thrust plate and/or the inner surface of the sleeve member at a portion axially opposing the thrust plate. The lubricating fluid continuously fills the gap defined by the shaft and the sleeve member so as to hold the radial bearing portion and the thrust bearing portion.

Such hydrodynamic pressure bearing looses its effectiveness if the lubricating fluid decreases substantially at either the radial bearing portion or the thrust bearing portion. In a conventional hydrodynamic pressure bearing, it is liable that lubricating fluid escapes or leaks away from the bearing portion for the following reasons: (1) evaporation; (2) leakage due to thermal expansion of air bubbles in the lubricating fluid (such air bubbles are likely to enter or grow in the lubricating fluid when the lubricating fluid is filled in the gap) with the rising of temperature in the bearing; (3) spattering and/or leakage of the lubricating fluid due to imbalance of the lubricating fluid because of nonuniformity in the shape of the grooves formed at the radial bearing portion and/or the thrust bearing portion; (4) leakage of the fluid due to narrowing of the gap between the shaft and the sleeve member by the thermal expansion of the members caused by temperature rise in the bearing; and (5) leakage due to centrifugal forces generated by the relative rotation of the shaft and the sleeve members, and also due to oil migration phenomena (in which the lubricating fluid spreads along the surface of the shaft and/or the surface of the sleeve member and oozes out of the bearing). These factors tend to decrease the amount of lubricating fluid within the bearing portion and decrease the operating life of the hydrodynamic pressure bearing.

SUMMARY OF THE INVENTION

It is an object of the present invention to provide a reliable hydrodynamic pressure bearing which has a long operating life.

It is an another object of the present invention to provide a motor with a hydrodynamic pressure bearing in which decrease of lubricating fluid in the gap is minimized and this factor which may decrease the operating life of the bearing is minimized.

It is further object of the present invention to provide a hydrodynamic pressure bearing structure which stably holds the lubricating fluid within the bearing portion.

It is still further object of the present invention to provide a hydrodynamic pressure bearing which positively distributes and holds the lubricating fluid filled therein, whereby such a decrease in the operating life of the bearing will be minimized.

In the thrust bearing portion, the lubricating fluid retained therein tends to be pumped radially outwardly by centrifugal force generated by the relative rotation of the shaft and the sleeve member. The flow of the lubricating fluid in the thrust bearing portion draws the lubricating fluid retained in the radial bearing portion, as the result, the lubricating fluid retained in the radial bearing portion is reduced. Such reduction of the lubricating fluid in the radial bearing portion inhibits the bearing from stably supporting the rotary member. Consequently, there arises a need for controlling the flow of lubricating fluid between the radial bearing portion and thrust bearing portion.

In a hydrodynamic pressure bearing according to the present invention, the lubricating fluid held in the radial bearing portion is pumped toward the thrust bearing portion by the grooves formed in the radial bearing portion. And the hydrodynamic pressure bearing is provided with a circumferential groove formed in a vicinity of the boundary region between the radial and thrust bearing portions so as to control the flow of lubricating fluid between the bearing portions depending on the amount of lubricating fluid held therein.

The circumferential groove is formed on the sleeve member near the inner opening of a communicating hole which in turn axially passes through the thrust plate and communicates the gap defined by the shaft and the sleeve member with external atmosphere. While a predetermined amount of lubricating fluid is retained in the gap, some extra lubricating fluid is also retained in the vicinity of the inner opening of the communicating hole. As the lubricating fluid is reduced by evaporation or other factors, air enters into the gap through the communicating hole by the effect of atmospheric pressure in place of the lubricating fluid. The air is retained near the circumferential groove and separates the lubricating fluid into the radial bearing portion and the thrust bearing portion. As a result, the flow of the lubricating fluid is interrupted. Since the communicating hole connects the gap with the external atmosphere, the air bubbles in the lubricating fluid are trapped by the circumferential groove and purged through the communicating hole to the outside atmosphere.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

With reference to the drawings, an embodiment of a hydrodynamic pressure bearing according to the present invention will be described.

Figure 1:
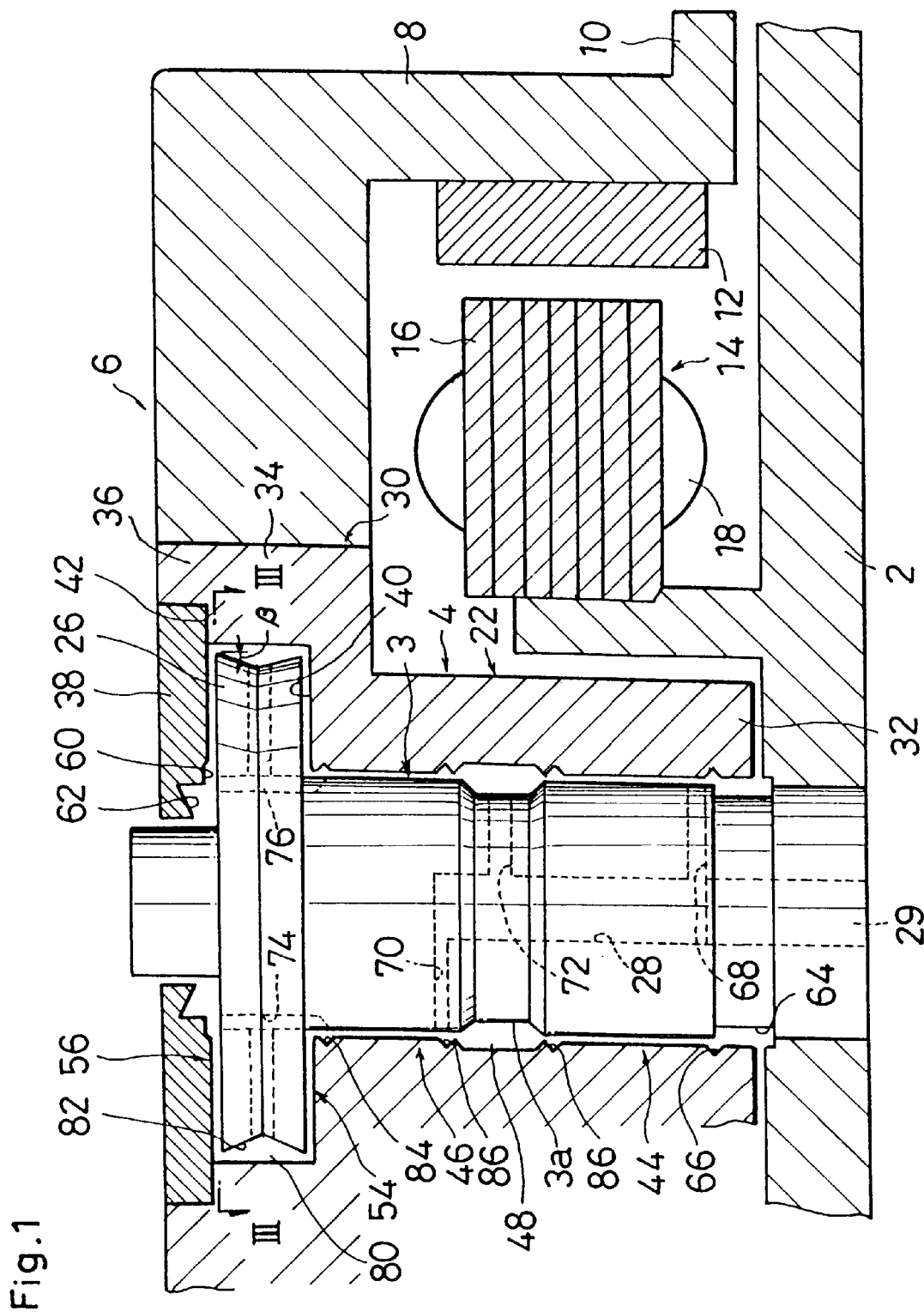
FIG. 1 is a partial cross-sectional view of a brushless DC motor having a hydrodynamic pressure bearing according to the present invention.

FIG. 1 shows an example of a hydrodynamic pressure bearing according to the present invention used in a spindle motor for use in a hard disk drive. A spindle motor shown in FIG. 1 includes a base plate 2 to be mounted on the base member (not shown) of a hard disk drive. One end of a shaft 3 is fixed to the base plate 2, and a rotor 6 is rotatably supported by the shaft 3 through a hydrodynamic pressure bearing 4. The rotor 6 has a cylindrical hub 8. A disk mounting flange 10 projects radially outwardly from the bottom end of the hub 8 for carrying at least one recording disk (not shown). A rotor magnet 12 is secured to the inner circumferential surface of the hub 8. A stator 14 is mounted on the base plate 2 so as to oppose the rotor magnet 12. The stator 14 includes a stator core 16 formed by a lamination of a plurality of core plates, and a coil 18 wound around the stator core 16. When electric current flows to the coil 18, the rotor 8 rotates in a predetermined direction by a reciprocal magnetic action of the stator 14 and the rotor magnet 12.

The hydrodynamic pressure bearing 4 shown in FIG. 1 is comprised of a shaft 3 and a sleeve member 22 attached to the hub 8. The shaft 3 has a disk-shaped thrust plate 26 extending radially outwardly from and fitted coaxially on the free end of the shaft 3. The shaft 3 has an air chamber 28 extending along the axis of the shaft 3 from the fixed end to an intermediate portion of the shaft 3. The opening of the air chamber 28 to the outside of the shaft 3 is sealed with a plug 29.

Figure 2:
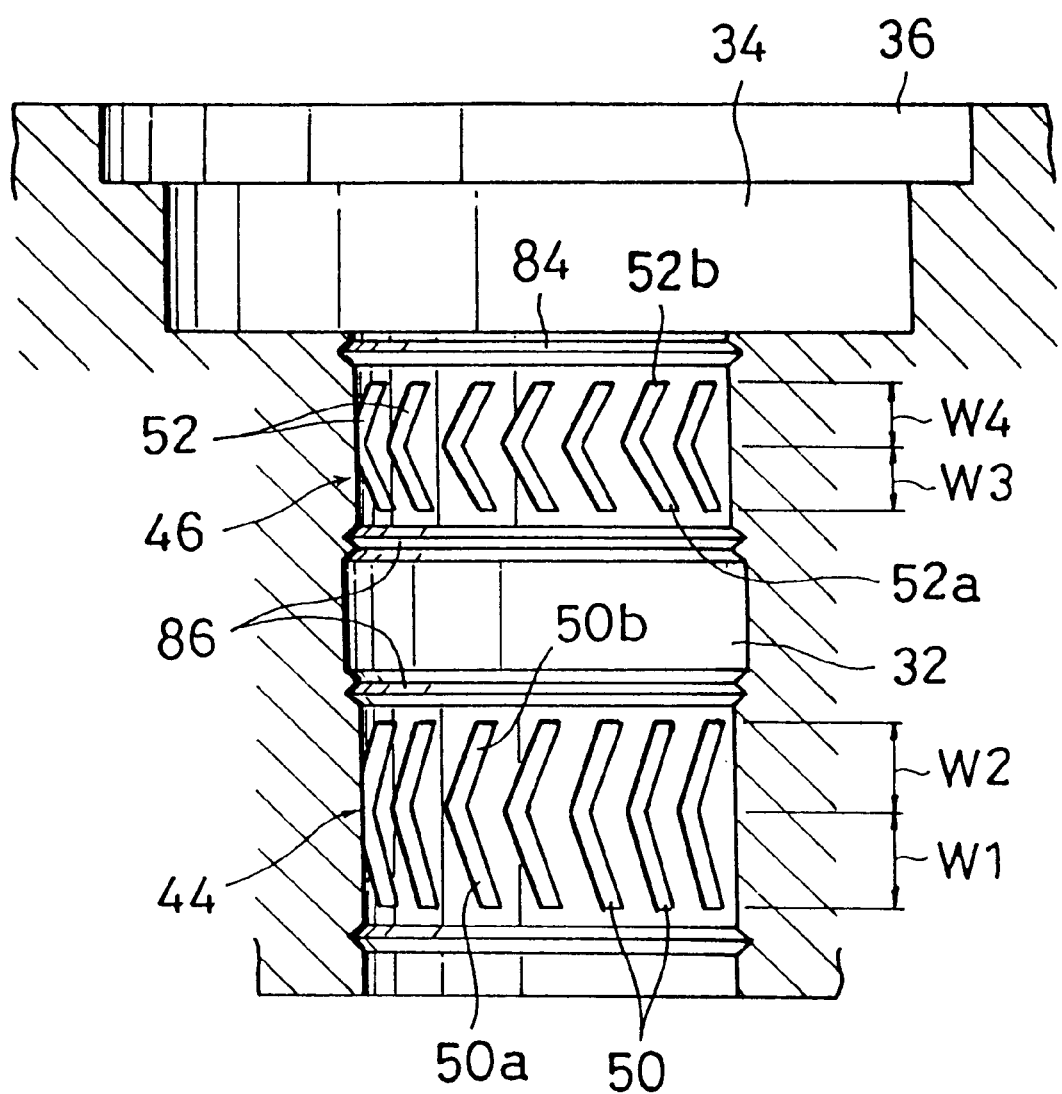
FIG. 2 is a partial cross-sectional view of a sleeve member of the hydrodynamic pressure bearing shown in FIG. 1.
Figure 3:
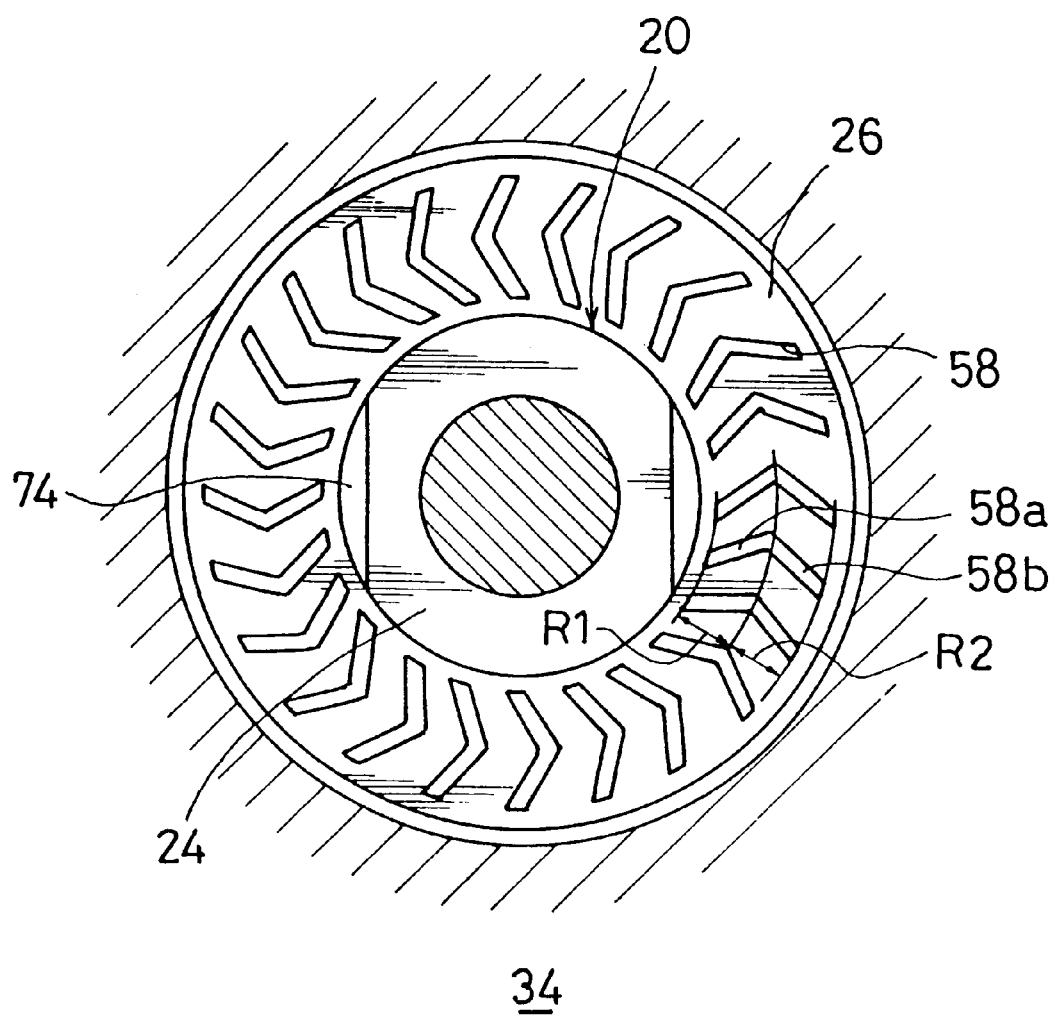
FIG. 3 is a cross-sectional view taken along the line III—III of FIG. 1.

With reference to FIGS. 1 through 3, the hydrodynamic pressure bearing 4, as an embodiment of the present invention, will be described in further detail. A sleeve member 22 has a hollow cylindrical sleeve body 30. The sleeve body 30 includes a sleeve portion 32 with a small inner diameter, an annular shoulder 34 having an inner diameter larger than the sleeve portion 32, and an annular stepped portion 36 having an inner diameter larger than the annular shoulder 34. The sleeve portion 32, the annular shoulder 34 and the annular stepped portion 36 are arranged in the described order from the end of the sleeve body 30 on the side of the base plate 2 toward the other end of the sleeve. The inner diameter of the sleeve portion 32 is slightly larger than the outer diameter of the shaft 3 and the inner diameter of the annular shoulder portion 34 is slightly larger than the outer diameter of the thrust plate 26. Thus, the shaft 3 may be inserted into the sleeve portion 32 to form a gap between the sleeve portion 34 and the shaft 3 and the sleeve body 30 and the thrust plate 26 for receiving and retaining lubricating fluid therein.

A thrust bush 38 is fixed to the annular stepped portion 36 of the sleeve body 30 so as to rotate integrally with the sleeve body 30 and to form a part of the sleeve member 22. The thrust bush 38 covers the upper surface of the thrust plate 26 to form a gap between the thrust bush 38 and the thrust plate 26 for receiving and retaining a lubricating fluid therein. The thrust bush 38 is secured to the sleeve body 30 by means of, for example, caulking.

In this embodiment, the radial bearing portions 44 and 46 are respectively composed of the outer surface of the shaft 3, the inner surface of the sleeve portion 32 of the sleeve body 30 radially opposing to the shaft 3 and the lubricating fluid filled therebetween. The radial bearing portions 44 and 46 are spaced from each other in axial direction. Each of radial bearing portions 44 and 46 bears a radial load acting upon the rotor 6 during its rotation. The shaft 3 includes a small diameter portion 3a formed between the radial bearing portions 44 and 46 for forming a reservoir 48, as described later, between the sleeve portion 32 and the small diameter portion. With reference to FIG. 2, the pair of radial bearing portions 44 and 46 have a plurality of herringbone grooves 50 and 52 formed on the inner surface of the sleeve portion 32. The grooves of each radial bearing portions 44 and 46 are circumferentially arranged at intervals.

A thrust bearing portion 54 is composed of the lower surface of the thrust plate 26, the upper surface of the annular shoulder 34 of the sleeve body 30 axially opposing the thrust plate 26, and the lubricating fluid filled therebetween. The thrust bearing portion 56 is composed of the upper surface of the thrust plate 26 and the lower surface of the thrust bush 38 axially opposed thereto and the lubricating fluid filled therebetween. Thus, the thrust bearing portions 54 and 56 bear thrust load acting upon the rotor 6 during its rotation. On the upper surface of the thrust plate 26, a plurality of herringbone grooves 58 are formed at intervals in circular direction as shown in FIG. 3. A plurality of herringbone grooves are also formed on the lowermost surface of the thrust plate 26 at intervals in circular direction.

In this embodiment, an annular recess 60 and a tapered portion 62 are formed on the lower surface of the thrust bush 38 axially opposing to the upper surface of the thrust plate 26. The annular recess 60 provides a relatively larger gap with the upper surface of the thrust plate 26. The tapered portion 62 radially abuts or adjoins the inside of the annular recess 60 and increases the space from the upper surface of the thrust plate 26 as it goes in a radially outward direction. The tapered portion 62 consists of a vertical surface continuously extending substantially vertically from the annular recess 60 and an oblique surface inclined from the top of this vertical surface toward the thrust plate 26. The annular recess 60 facilitates purging of air bubbles in the lubricating fluid, and also facilitates flow of the lubricating fluid toward the thrust bearing portion 56 (radially outwardly direction) when the amount of the lubricating fluid decreases in the thrust bearing portion 54 and 56. The space between the bottom surface of the annular recess 60 and the upper surface of the thrust plate 26 is preferably approximately 0.05 millimeters to 0.08 millimeters (0.05 mm. to 0.08 mm.) and the space between the tapered portion 62 and the upper surface of the thrust plate 26 is larger than the space between the upper surface of the thrust plate 26 than and the bottom surface of the annular recess 60.

The shaft 3 is formed with an annular groove 64 in the vicinity of its end fixed to the base plate 2. The sleeve portion 32 is formed with an annular cutout 66 having a V-shaped configuration in cross section and located at a position opposing the annular groove 64. The annular cutout 66 serves to trap the lubricating fluid that is to leak under the influence of centrifugal forces generated during relative rotation of the sleeve member 22 and the shaft 3 thereby preventing any leakage or oozing out of the lubricating fluid from the bearing portion.

In the hydrodynamic pressure bearing according to the present invention, a pair of supply ports 68 and 70 and a hole 72 are formed within the shaft 3 so as to communicate the gap with the air chamber 28 provided in the shaft 3. One end portion of the supply port 68 opens at a portion of the shaft 3 opposing to the lowermost end of a herringbone groove 50 of the radial bearing portion 44 (the end on the base plate side or lower side as viewed in FIG. 1). The other end portion of the supply port 68 opens at the lowermost end of the cylindrical space formed with the opening of the air chamber 28 being sealed by the plug 29. In this embodiment, the herringbone groove 50 formed on the inner surface of the sleeve member 22 has an asymmetrical configuration in the axial direction such that the axial height W1 of a lower groove portion 50a of the herringbone groove 50 (which extends downward and slants to the right in FIG. 2) is longer than the axial height W2 of an upper groove portion 50b of the herringbone groove 50 (which extends upwardly and slants to the right in FIG. 2) (W1>W2). When the sleeve member 22 rotates relatively to the shaft 3, the lower groove portion 50a generates greater pressure in the lubricating fluid than the pressure generated by the upper groove portion 50b and then the lubricating fluid is pumped toward the thrust bearings 54 and 56. One end of the supply port 68 opens at a portion of the shaft 3 opposing to the axially external end of the lower groove portion 50a of the herringbone groove 50. As the amount of lubricating fluid retained in the radial bearing portion 44 decreases, the lubricating fluid reserved in the air chamber 28 is supplied through the supply port 68 to the radial bearing portion 44 by the pumping action of the herringbone groove 50.

One end of the other supply port 70 opens at a portion of the shaft 3 opposing to the lower end of the herringbone groove 52 (the base plate side end) of the radial bearing portion 46 and the other end portion opens at the uppermost end of the cylindrical space formed by the air chamber 28. In this embodiment, the herringbone groove 52 formed on the inner surface of the sleeve member 22 has an asymmetrical configuration in the axial direction such that the axial height W3 of a lower groove portion 52a of the herringbone groove 52 (which extends downward and slants to the right in FIG. 2) is larger than the axial height W4 of the upper groove portion 52b of the herringbone groove 52 (which extends upward and slants to the right in FIG. 2) (W3>W4). When the sleeve member 22 rotates relatively to the shaft 3, the lower groove portion 52a generates greater pressure in the lubricating fluid than the pressure generated by the upper groove portion 52b and the lubricating fluid is pumped toward the thrust bearings 54 and 56. One end of the supply port 70 opens at a portion of the shaft 3 opposing the axially external end of the lower groove portion 52a of the herringbone groove 52. As the amount of lubricating fluid retained in the radial bearing portion 46 decreases, the lubricating fluid reserved in the air chamber 28 is supplied through the supply port 70 to the radial bearing portion 46 by the pumping action of the herringbone groove 52. The axial height W3 of the upper groove 52a may be made substantially equal to the axial height W4 of the lower groove 52b so as to balance the pressure generated by them with each other.

The clearance formed between the small diameter portion 3a of the shaft 3 and the inner surface of the sleeve member 22 is somewhat larger than the gap at the adjacent radial bearing portions 44 and 46 to form the reservoir 48 for storing the lubricating fluid. One end of the hole 72 opens to the small diameter portion 3a and the other end of the hole 72 opens to the upper portion of the cylindrical space formed by the air chamber 28. While a predetermined amount lubricating fluid is retained in the gap between the shaft 3 and the sleeve member 22, the lubricating fluid is also stored in the hole 72 which serves as a part of the reservoir 48. As the lubricating fluid retained in the gap decreases, the pressure of the air in the chamber 28 exceeds the surface tension of the lubricating fluid and the lubricating fluid stored in the reservoir 48 and the hole 72 is supplied to the bearing portion.

In this embodiment, a plurality of communicating holes 74 and circulation holes 76 of the same number are also provided in the thrust plate 26. The communicating holes 74 are formed in the axial direction by the cutouts which in turn are formed on the outer periphery of the free end portion of the shaft 3 in the vicinity of the thrust plate 26. The communicating holes 74 open at the upper and lower surfaces of the thrust plate 26. The circulation holes 76 are provided in the thrust plate 26 and angularly spaced apart at 180 degree (180°) from each other. One end of each of the circulation holes 76 opens to one of the communicatings hole 74 and the other end of each hole 76 opens at the outer circumferential surface of the thrust plate 26.

The herringbone grooves 58 of the thrust bearing portions 54 and 56 have respectively asymmetrical configuration in a radial direction such that the radial extension R1 of the inside groove portion 58a of the herringbone groove 58 (which is in the radially inner portion in FIG. 3) is larger than the radial extension R2 of the outer groove portion 58b of the herringbone groove 58 (which is in the radially outer portion in FIG. 3) (R1>R2). When the sleeve member 22 rotates relatively to the shaft 3, the inside groove portion 58a generates greater pressure in the lubricating fluid than the pressure generated by the outer groove portion 58b and the lubricating fluid retained in the thrust bearing portions 54 and 56 is pumped in the radially outward direction. In addition to pumping action generated by the herringbone-shaped groove 58, relative rotation of the shaft 3 and the sleeve member 22 exerts a centrifugal force upon the lubricating fluid. As a result, the lubricating fluid retained in the thrust bearing portions 54 and 56 flows in the radially outward direction and reaches the gap between the outer circumferential surface of the thrust plate 26 and the inner circumferential surface of the sleeve body 30, the lubricating fluid passes through the circulation hole 76 and the communicating hole 74, and returns to the thrust bearing portions 54 and 56. In the thrust bearing portions 54 and 56, the radial extension R1 of the inner groove portion 58a may be made substantially equal to the extension R2 of the outer groove portion 58b so as to balance the pressure produced by the groove portions. In such a case, the lubricating fluid in the thrust bearings 54 and 56 flows radially outwardly by the centrifugal force generated by the relative rotation of the shaft 3 and the sleeve member 22.

An annular recess 82 is provided on the outer circumferential surface of the thrust plate 26 so as to form an annular reservoir 80. In this embodiment, the annular recess 82 shallow substantially V-shaped cross-sectional configuration opening radially outwardly. Thus, the clearance between the outer circumferential surface of the thrust plate 26 and the inner circumferential surface of the sleeve body 30 that radially opposes the thrust plate 26, increases in a tapered configuration from both end portions of the outer circumferential surface of the thrust plate 26. The angle β of inclination of the tapered portion at the annular recess 82 is approximately 20 degree to 30 degree (20° to 30°).

In the hydrodynamic pressure bearing 4 according to the present embodiment, a circumferential groove 84 is also provided on the inner surface of the sleeve portion 32 of the sleeve member 22 near the axially outer end of the radial bearing portion 46 on the side of the thrust bearing portions 54 and 56. The groove 84 as a fluid flow control for controlling the flow of the lubricating fluid between the thrust bearing portion 54 and the radial bearing portion 46. As described above, the lubricating fluid retained in the thrust bearing portion 56 tends to be pumped in the radially outward direction by the pumping action of the herringbone groove 58 and by the centrifugal force generated by the relative rotation of the shaft 3 and the sleeve member 22. The flow of the lubricating fluid in the thrust bearing 54 draws the lubricating fluid retained in the radial bearing 46. As the result, the amount of lubricating fluid retained in the radial bearing portion 46 is reduced, and such a reduction of the lubricating fluid in the radial bearing 46 is liable to inhibit the radial bearing portion 46 from stably supporting the rotor 6. Consequently, there arises a need for controlling the flow of the lubricating fluid between the radial bearing portion 46 and thrust bearing portions 54 and 56.

The circumferential groove 84 is provided in the vicinity of the inner opening of the communicating hole 74 which axially passes through the upper and lower surfaces of the thrust plate 26 and communicates to the outside atmosphere. While predetermined amount of the lubricating fluid is retained in the gap defined by the shaft 3 and the sleeve member 22, the lubricating fluid is also retained in the communicating hole 74 and in the gap defined by the lower surface of the thrust plate 26 and the upper surface of the annular shoulder 34 that axially opposes the lower surface of the thrust plate 26 in the vicinity of the lower opening of the communicating hole 74. Once the lubricating fluid decreases due to evaporation or other factors, the lubricating fluid retained in the communicating hole 74 is supplied to the radial bearing portions 46 and the thrust bearing portions 54 and 56 by the atmospheric pressure and the air enters into the gap through the communicating hole 74 and stays near the circumferential groove 84. The air staying near the circumferential groove 84 separates the lubricating fluid at the radial bearing portion 46 from the lubricating fluid at the thrust bearing portions 54 and 56, and as a result, the flow of the lubricating fluid is interrupted. Because the communicating hole 74 communicates to the atmosphere, the air bubbles existing in the lubricating fluid and trapped in the circumferential groove 84 are easily purged to outside atmosphere through the communicating hole 74.

On the inner surface of the sleeve member 22, at respective axial inner ends of the radial bearing portions 44 and 46, a plurality of annular grooves 86 are formed with substantially V-shaped configuration to trap metallic powder produced by friction and mixed in the lubricating fluid retained in the gap between the shaft 3 and the sleeve member 22.

With reference to FIGS. 1 through 8, explanation will now be made about progress of the condition of the lubricating fluid retained in the hydrodynamic pressure bearing 4 as described above. In FIGS. 4 through 8 the portions marked with black dots show the lubricating fluid.

Figure 4:
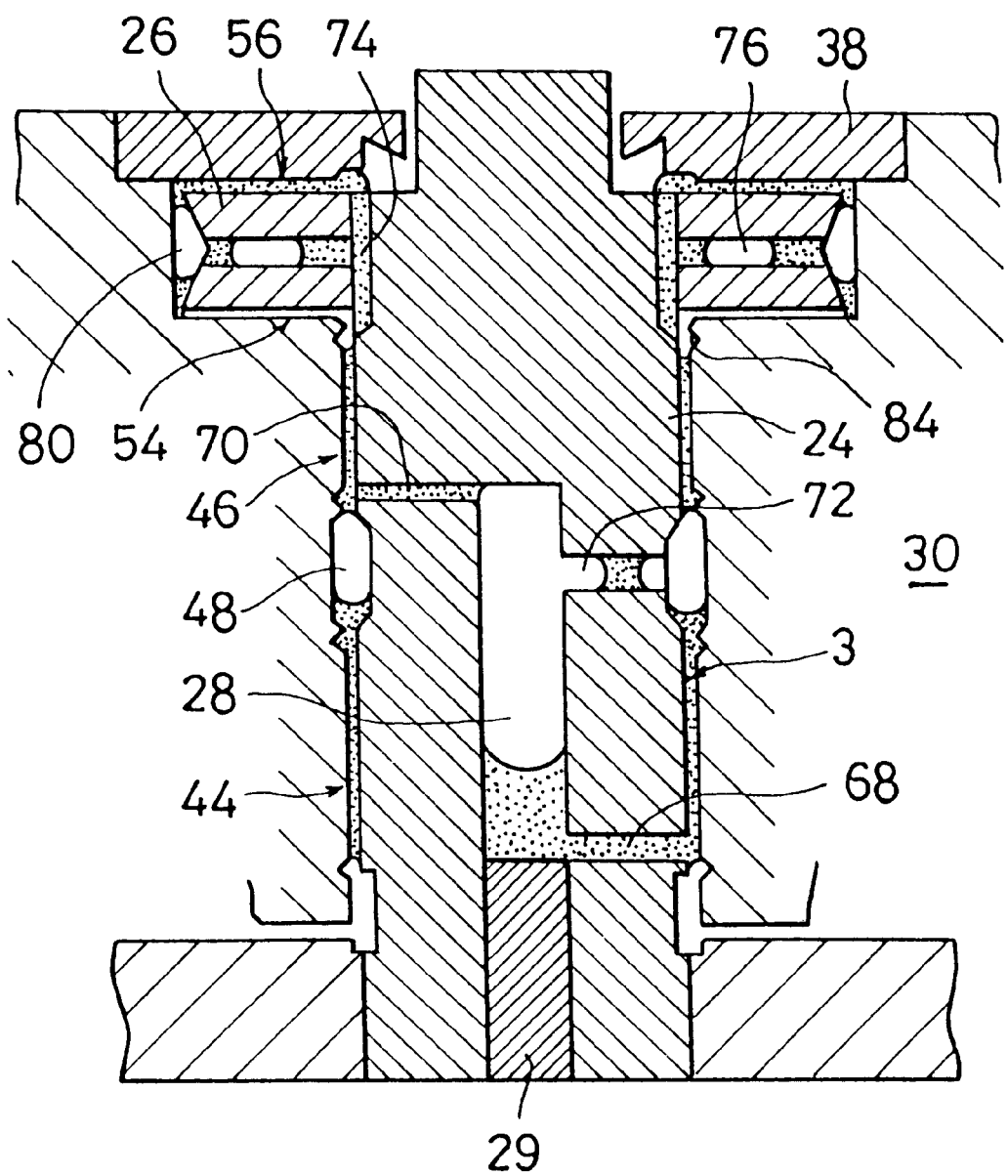
FIG. 4 is a cross-sectional view showing the distribution condition of the lubricating fluid after being filled in the gap of the hydrodynamic pressure bearing according to the present invention.

FIG. 4 shows a condition immediately after the hydrodynamic pressure bearing 4 has been assembled. The lubricating fluid is filled in the hydrodynamic pressure bearing 4 by the process, for example, as disclosed in Japanese Patent Publication 8-4777 (1996). An appropriate amount of the lubricating fluid is filled in the uppermost portion of the outer surface of the shaft 3 under the condition that a part of the shaft 3 fixed to the base plate 2 is inserted to the cylindrical portion 32 of the sleeve body 30 from the upper portion and then the shaft 3 is further inserted to the cylindrical portion 32. In the assembling process, the lubricating fluid is sucked into the gap defined by the outer surface of the shaft 3 and the inner surface of the cylindrical member 32. After the insertion of the shaft 3 to the sleeve portion 32, the thrust plate 26 is secured to the shaft 3. And the remaining fluid is dropped onto the upper surface of the thrust plate 26 and then the thrust bush 38 is fixed on the annular stepped portion 36 of the sleeve body 30. Thus, the hydrodynamic pressure bearing 4 is assembled.

In the condition shown in FIG. 4, i.e. just after the lubricating fluid has been filled into the gap, a large amount of the lubricating fluid has flowed into the air chamber 28 besides the portions of the bearings 44, 46, 54 and 56, and many air bubbles are mixed in the lubricating fluid during the process of filling the lubricating fluid into the hydrodynamic pressure bearing 4. The amount of lubricating fluid filled in the hydrodynamic pressure bearing 4 is the sum of the amount of the lubricating fluid substantially corresponding to the volume of the gap between the inner surface of the sleeve member 22 and the shaft 3 and the amount of the lubricating fluid stored in the air chamber 28, the reservoir 48, the annular resevoir 80 and the communicating hole 74.

Figure 5:
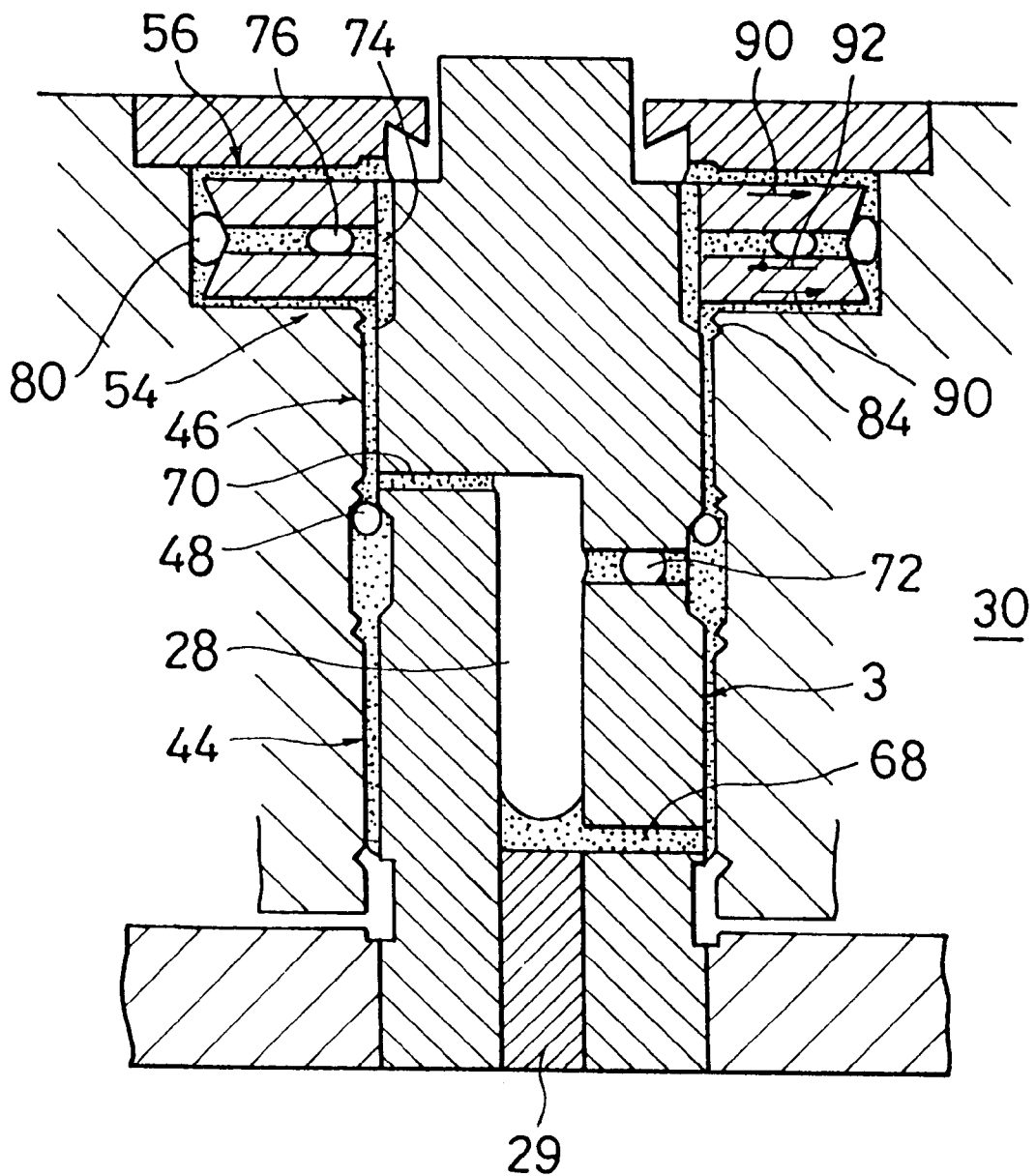
FIG. 5 is a cross-sectional view showing the preliminary condition of the lubricating fluid after the rotational member has been rotated by predetermined number of times so as to distribute the lubricating fluid into predetermined positions.

When the rotor 6 rotates in the condition of the bearing shown in FIG. 4, the lubricating fluid filled in the gap is distributed as shown in FIG. 5. As rotor 6 rotates, the sleeve member 22 rotates therewith. When the sleeve member 22 rotates, the lubricating fluid retained in the thrust bearing portions 54 and 56 is pumped to flow in a direction indicated by the arrow 90 by the centrifugal force and the pumping action generated by the herringbone groove 58 formed in the thrust bearing portions 54 and 56 and the lubricating fluid flows into the annular reservoir 80. The lubricating fluid stored in the annular reservoir 80 flows radially inwardly to the radially inside portion of the thrust bearing portions 54 and 56 through the circulating holes 76 and the communicating holes 74 so as to circulate the lubricating fluid around the thrust plate 26. The air bubbles mixed in the lubricating fluid are separated from the lubricating fluid. In this process of circulation of the lubricating fluid, the air bubbles mixed in the lubricating fluid are separated from the lubricating fluid at the annular recess 60 and the tapered portion 62 formed on the thrust bush 38 and purged to the outside atmosphere.

The lubricating fluid flowing into the lower end of the air chamber 28 is supplied to the radial bearing portion 44 by pumping action generated by the herringbone groove 50 of the radial bearing 44 through the supplying hole 68. Further, the lubricating fluid supplied in the radial bearing portion 44 is pumped toward the thrust bearing portions 54 and 56 by the axially asymmetrical herringbone groove 50 and then the lubricating fluid is supplied to the thrust bearing portions 54 and 56 through the radial bearing portion 46. If the amount of the lubricating fluid to be supplied from the air chamber 28 to the radial bearing portion 44 exceeds a predetermined amount, the lubricating fluid is returned into the air chamber 28 through the hole 72 opened to the reservoir 48.

The lubricating fluid which has flowed into the vicinity of the uppermost end of the air chamber 28 is also supplied to the thrust bearing portions 54 and 56 by the pumping action generated by the herringbone groove 52 of the radial bearing portion 46. As the lubricating fluid retained in the radial bearing portions 44 and 46 is supplied to the thrust bearing portions 54 and 56 and circulates around the thrust plate 26, the air bubbles mixed in the lubricating fluid retained in the radial bearing portions 44 and 46 are separated from the lubricating fluid at the annular recess 60 and the tapered portion 62 and purged to the outside atmosphere.

Figure 6:
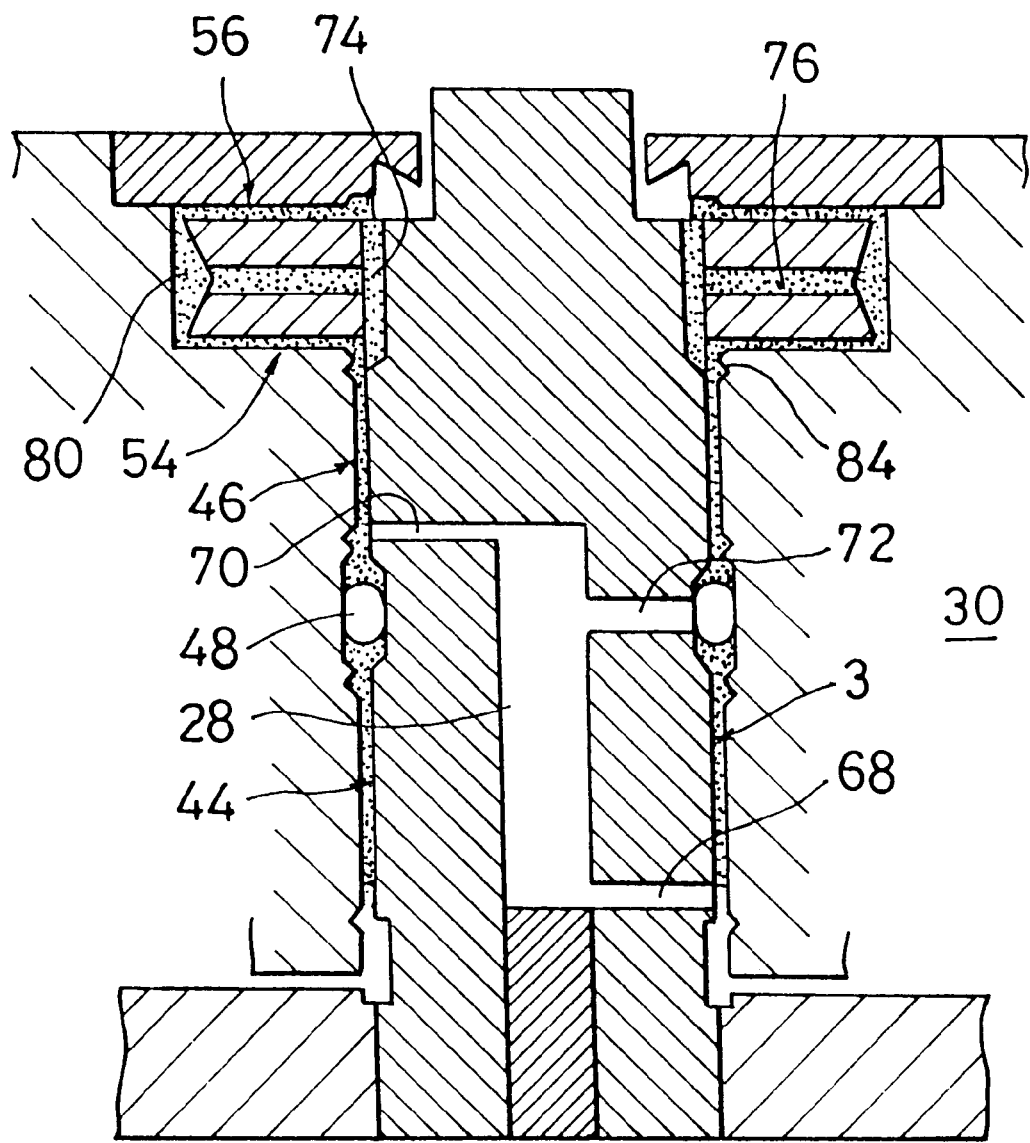
FIGS. 6, 7 and 8 are cross-sectional views showing the process of decreasing of the lubricating fluid in the hydrodynamic pressure bearing as time passes after the preliminary condition shown in FIG. 5.

FIG. 6 shows the condition when the amount of lubricating fluid filled in the hydrodynamic pressure bearing 4 has slightly decreased. The lubricating fluid retained in the air chamber 28 shown in FIG. 5, flows toward the thrust bearing portions 54 and 56 by the pumping action generated by the herringbone groove 50 of the radial bearing portion 44 and is reserved in the reservoir interposed between the radial bearing portions 44 and 46 and the annular reservoir 80 formed between the outer circumferential surface of the thrust plate 26 and the inner circumferential surface of the sleeve body 30. The reservoir 48 supplies the lubricating fluid to the radial bearing portions 44 and 46 and the annular reservoir 80 supplies the lubricating fluid to the radial bearing portion 46 and the thrust bearing portions 54 and 56. In the condition shown in FIG. 6, as air enters into the axially outward portion of the radial bearing portion 44 and a part of the lower groove portion 50a of the herringbone groove 50 is exposed to the air, the axial height W1 of the lower groove portion 50a becomes substantially equal to the axial height W2 of the upper groove portion 50b, whereby the pressure generated by the lower groove portion 50a and the upper groove portion 50b are balanced with each other. Thus, the lubricating fluid is retained in the radial bearing portion 44 without flow toward the thrust-bearing portion 54.

In the condition shown in FIG. 6, the air bubbles staying in the reservoir 48 inhibit the lubricating fluid from flowing between the radial bearing portions 44 and 46.

Figure 7:
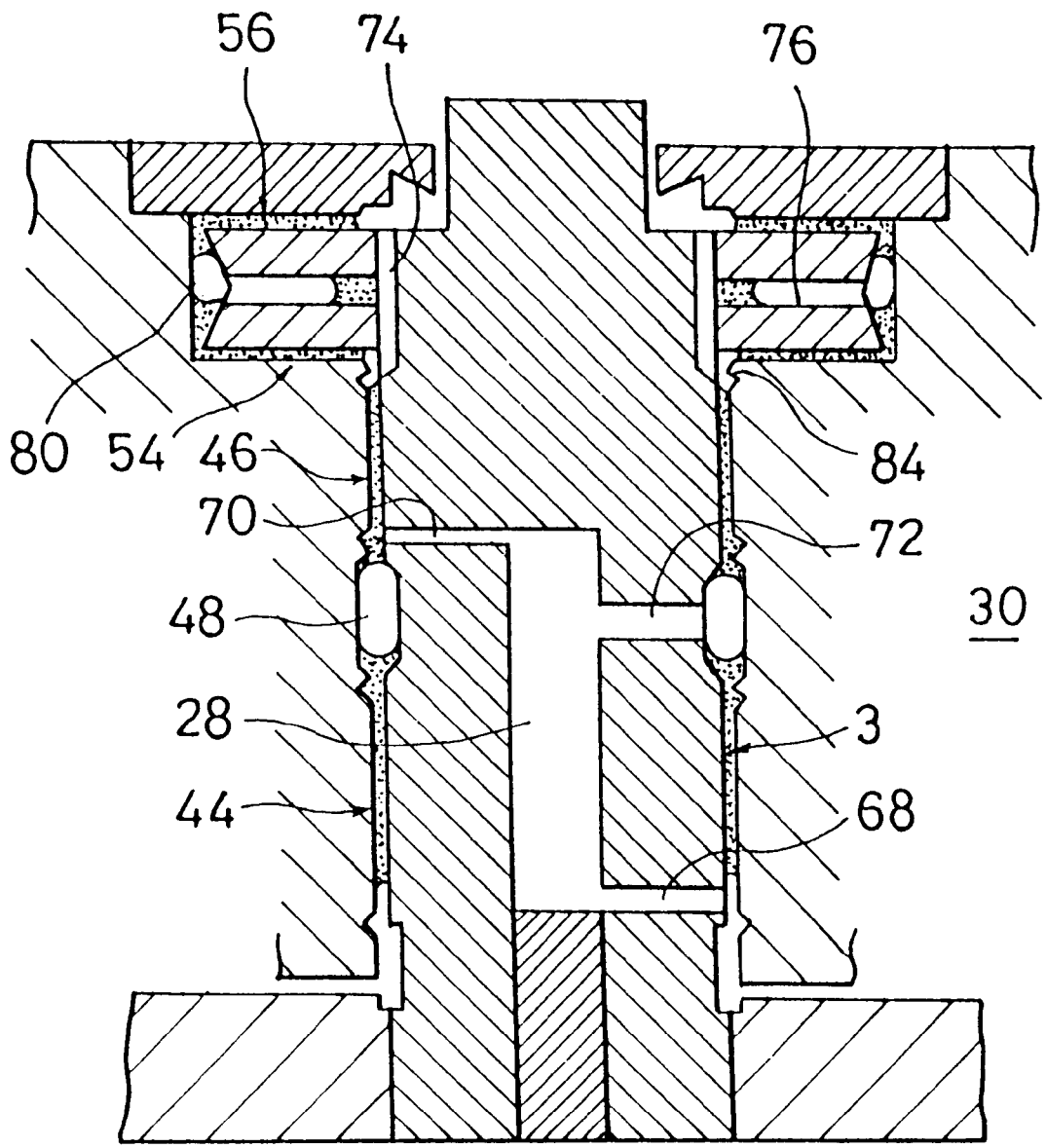

FIG. 7 shows the condition that the lubricating fluid in the hydrodynamic pressure bearing 4 has decreased further from the condition shown in FIG. 6. The lubricating fluid reserved in the reservoir 48 and the annular reservoir 80 shown in FIG. 6 is supplied to the radial bearing portions 44 and 46 and the thrust bearing portions 54 and 56, as the result, the air bubble staying in the reservoir 48 and the annular reservoir 80 is expanded. Atmospheric air also enters the communicating hole 74 and the circumferential groove 86 to separate the lubricating fluid at the thrust bearing portions 54 and 56 from the lubricating fluid at the radial bearing portion 46 and therefore the flow of the lubricating fluid between the bearing portions is inhibited.

Figure 8:
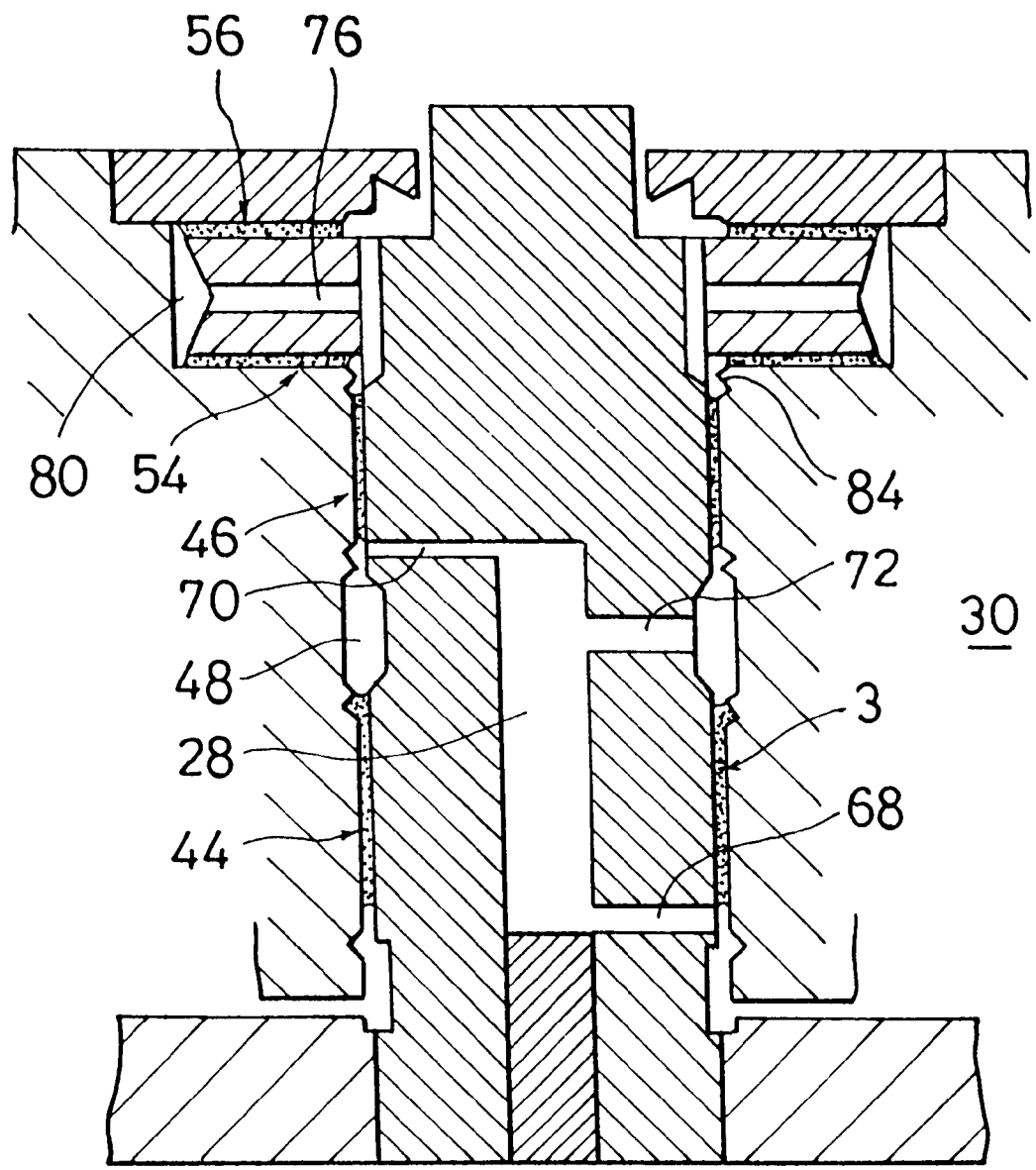

FIG. 8 shows the condition that the lubricating fluid has decreased further from the condition shown in FIG. 7. In that condition, the lubricating fluid is retained only at the radial bearing portions 44 and 46 and the thrust bearing portions 54 and 56 where the herringbone grooves 50, 52 and 58 are formed. When the lubricating fluid retained in any of the bearing portions has been exhausted, the hydrodynamic pressure bearing 4 becomes inoperable.

In the hydrodynamic pressure bearing 4 of this embodiment as described above, the lubricating fluid filled therein is appropriately distributed by the rotation of the rotor 4. As the lubricating fluid decreases, the lubricating fluid at the radial bearing portions 44 and 46 and the thrust bearing portions 54 and 56 are separated successively. Therefore, appropriate distribution of the lubricating fluid is ensured in the hydrodynamic pressure bearing according to the present invention, so that stable long life operation of the bearing will be attained.

Although the embodiment of the present invention described in the specification is applied to a shaft stationary type spindle motor for use in a hard disk drive, the hydrodynamic pressure bearing according to the present invention may also be applied to a shaft rotating type spindle motor for use in a hard disk drive spindle and other types of motors, including but not limited to a DC motor for use in a CD-ROM drive.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A hydrodynamic bearing comprising:

a shaft;

a sleeve member for receiving said shaft, said shaft and said sleeve member defining a gap therebetween;

said gap having upper and lower open ends and hydrodynamic fluid filled within said gap;

at least one set of asymmetric grooves on said shaft or sleeve aligned to pump said hydrodynamic fluid along said shaft;

a thrust plate coupled to said shaft in the vicinity of said upper open end thereof, said thrust plate having an upper and a lower surface having asymmetric grooves thereon to pump said hydrodynamic fluid toward an outer circumferential portion of said thrust plate and away from said shaft, said thrust plate further having a plurality of communicating holes traversing said thrust plate to open at said upper and lower surfaces, said upper opening of said communicating holes connecting with external atmosphere;

said sleeve member being provided with an annular groove disposed in the vicinity of said lower opening of said communicating holes such that air which enters into said gap through said communicating holes by atmospheric pressure is retained by said annular groove and said hydrodynamic fluid filled within said gap is controlled and balanced by said air so as to remain said hydrodynamic fluid in the bearings.

2. The hydrodynamic bearing of claim 1 wherein said one set of asymmetric grooves comprises two sections defining upper and lower journal bearings along said shaft, one of said two sections pumping said fluid toward said thrust plate.

3. The hydrodynamic bearing of claim 2 wherein said shaft defines an annular recess between said upper and lower journal bearings so as to be a reservoir for supplying said fluid to said upper and lower journal bearings.

4. The hydrodynamic bearing of claim 1 wherein said hydrodynamic fluid forms two capillary seals in the vicinity of said upper and lower open ends of said gap.

* * * * *